United States Patent
Vicente Rojo et al.

(10) Patent No.: US 12,510,485 B2
(45) Date of Patent: Dec. 30, 2025

(54) SYSTEM AND METHOD FOR DETERMINING THE CHEMICAL COMPOSITION OF LIQUID METALLURGICAL PRODUCTS

(71) Applicant: ArcelorMittal, Luxembourg (LU)

(72) Inventors: Asier Vicente Rojo, Castro Urdiales Cantabria (ES); Artzai Picon, Derio (ES); Aitor Alvarez Gila, Derio (ES)

(73) Assignee: Arcelormittal, Luxembourg (LU)

( * ) Notice: Subject to any disclaimer, the term of this patent is extended or adjusted under 35 U.S.C. 154(b) by 301 days.

(21) Appl. No.: 18/280,429

(22) PCT Filed: Mar. 10, 2021

(86) PCT No.: PCT/IB2021/051976
§ 371 (c)(1),
(2) Date: Sep. 5, 2023

(87) PCT Pub. No.: WO2022/189830
PCT Pub. Date: Sep. 15, 2022

(65) Prior Publication Data
US 2024/0133816 A1  Apr. 25, 2024

(51) Int. Cl.
*G01N 21/71* (2006.01)
*G01N 33/202* (2019.01)
*G01N 33/205* (2019.01)

(52) U.S. Cl.
CPC .......... *G01N 21/71* (2013.01); *G01N 33/202* (2019.01); *G01N 33/205* (2019.01)

(58) Field of Classification Search
CPC .... G01N 21/71; G01N 33/202; G01N 33/205; G01N 21/25
See application file for complete search history.

(56) References Cited

U.S. PATENT DOCUMENTS 6,172,367 B1 * 1/2001 Fritz ............... G01J 5/041
  250/341.1
6,640,199 B1 * 10/2003 Goldstein ............ G01N 21/71
  702/135

(Continued)

FOREIGN PATENT DOCUMENTS

FR  2572523 A1  5/1986
WO  WO 2016/181185  11/2016

OTHER PUBLICATIONS

Picon Artzai et al, "Ladle Furnace Slag Characterization Through Hyperspectral Reflectance Regression Model for Secondary Metallurgy Process Optimization", IEEE Transactions on Industrial Informatics, IEEE Service Center, New York, NY, US, vol. 14, No. 8, doi:10.1109/TII.2017.2773068, ISSN 1551-3203, (Aug. 2018), pp. 3506-3512, (Aug. 6, 2018).

(Continued)

*Primary Examiner* — Sang H Nguyen
(74) *Attorney, Agent, or Firm* — Davidson Kappel LLC (57) ABSTRACT

A device for determining the chemical composition of a liquid metallurgical product emitting electromagnetic radiations. The device including a collection probe configured to acquire the electromagnetic radiations emitted by the metallurgical product in a predetermined wavelength range $\Delta\lambda$, a spectroscopic device connected to the collection probe and configured to generate a spectral signal of the acquired electromagnetic radiations and processing means including a database of reference radiances. A method using the device is also provided.

11 Claims, 2 Drawing Sheets

(56) References Cited

U.S. PATENT DOCUMENTS

| | | | | |
|---|---|---|---|---|
| 2004/0084623 A1* | 5/2004 | Long | ............... | G01N 21/359 |
| | | | | 250/341.2 |
| 2012/0029836 A1* | 2/2012 | Hermann | ............... | G01J 3/443 |
| | | | | 702/28 |
| 2015/0300944 A1* | 10/2015 | Pelletier | ............... | G01J 3/10 |
| | | | | 315/72 |
| 2018/0120235 A1* | 5/2018 | Vicente Rojo | ....... | G01J 3/2803 |
| 2020/0116642 A1* | 4/2020 | Zabrodin | ............... | G01J 3/443 |
| 2020/0363328 A1* | 11/2020 | Le | ............... | G01N 21/274 |

OTHER PUBLICATIONS

Ash Joshua N et al, "Temperature-emissivity separation for LWIR sensing using MCMC", Proceedings of SPIE; [Proceedings of SPIE ISSN 0277-786X vol. 10524], SPIE, US, (May 17, 2016).

Wiecek B et al, "Multispectral systems for measuring the radiation parameters of steel slag during the discharge of steelworks furnace", 11th International Conference on Quantitative Infrared Thermography, QIRT; Jun. 11-14, 2012; Naples, Italy,, (Jun. 11, 2012), pp. 1-4.

\* cited by examiner

SYSTEM AND METHOD FOR DETERMINING THE CHEMICAL COMPOSITION OF LIQUID METALLURGICAL PRODUCTS

The invention is in the field of metallurgy, and more particularly in the field of liquid metallurgical products.

The invention refers more particularly to a system and a method for determining the chemical composition of liquid metallurgical products using electromagnetic radiations emitted by such metallurgical products.

BACKGROUND

A known issue in metallurgy is to properly characterize the metallurgical products when they are subjected to very high temperatures, typically more than 1000° C. and are therefore in liquid form due to their melting.

It is known from the publication WO 2016/181185 a sensor able to obtain the chemical composition of a solid slag portion, using an installation comprising a source of light adapted to lighten the slag portion, an optical system adapted to collect reflected light from the slag portion, and processing means adapted to obtain a dataset from the collected light, said dataset defining a matrix containing values representative of the intensity of the reflected light collected from a plurality of point. A regression algorithm is thus implemented to estimate chemical composition of the slag portion based on intensity of reflected light and its wavelength.

SUMMARY OF THE INVENTION

However, the system and method of the publication WO 2016/181185 cannot be applied to unknown metallurgical products. In addition, the slag portion must be excited by a source of light since only the reflected light is collected by the installation.

An aim of the present invention is to remedy the drawbacks of the prior art by providing a system and a method for determining the chemical composition of any liquid metallurgical product that emits electromagnetic radiations.

The present invention relates to a device for determining the chemical composition of a liquid metallurgical product emitting electromagnetic radiations, comprising at least:
  a collection probe configured to acquire the electromagnetic radiations emitted by the metallurgical product in a predetermined wavelength range $\Delta\lambda$,
  spectroscopic means connected to the collection probe and configured to generate a spectral signal of the acquired electromagnetic radiations,
  processing means configured to calculate an observed radiance $L_{obs}(\lambda, T_{est})$ from said generated spectral signal, and to estimate, from said calculated observed radiance, the temperature $T_{est}$ and the spectral emissivity $\varepsilon_{est}(\lambda, T_{est})$ of the metallurgical product in the predetermined wavelength range $\Delta\lambda$, said processing means including a database of reference radiances $L_{ref,i}(\lambda, T_{ref,n})$ of X samples i, i varying from 1 to X, in the predetermined wavelength range $\Delta\lambda$ and Z reference temperature $T_{ref,n}$, n varying from 1 to Z, comprising for each reference radiance:
    reference spectral emissivities $\varepsilon_{ref,i}(\lambda, T_{ref,n})$, associated to reference temperatures $T_{ref,n}$ in the predetermined wavelength range $\Delta\lambda$, and
    the chemical composition of said samples i and being configured to compare estimated spectral emissivity $\varepsilon_{est}(\lambda, T_{est})$ and estimated temperature $T_{est}$ with reference temperatures $T_{ref,n}$ and reference spectral emissivities $\varepsilon_{ref,i}(\lambda, T_{ref,n})$ in the predetermined wavelength range $\Delta\lambda$ and at estimated temperature $T_{est}$ included in said database, to determine the best fitting reference radiance $L_{bf}(\lambda, T_{ref})$ with the observed radiance $L_{obs}(\lambda, T_{est})$ and to determine the chemical composition of the liquid metallurgical product (2) from the determined best fitting reference radiance $L_{bf}(\lambda, T_{ref})$.

The device may also include the following optional characteristics considered individually or according to all possible combination of techniques:
  the spectroscopic means comprise a plurality of spectrometers, each spectrometer being connected to the collection probe and configured to generate a part of the spectral signal in a determined fraction of the predetermined wavelength range $\Delta\lambda$,
  the spectroscopic means are configured to generate the spectral signal in a spectral range between 200 and 12000 nanometres corresponding to the predetermined wavelength range $\Delta\lambda$,
  the processing means are also configured to correct each part of the spectral signal with at least a calibration constant calculated by said processing means and associated with the considered spectrometer.

The invention also provides a method for determining the chemical composition of a liquid metallurgical product emitting electromagnetic radiations with a device according to the invention, said method comprising the following steps:
  i. acquiring (E1) the electromagnetic radiations emitted by the metallurgical product (2) in the predetermined wavelength range $\Delta\lambda$;
  ii. generating a spectral signal (E2) by separating and measuring spectral components of said electromagnetic radiations emitted by the metallurgical product (2);
  iii. generating an observed radiance $L_{obs}(\lambda, T_{est})$ (E3) of the metallurgical product (2) from said spectral signal;
  iv. estimating (E4) from said observed radiance $L_{obs}(\lambda, T_{est})$ the temperature $T_{est}$ and the spectral emissivity $\varepsilon_{est}(\lambda, T_{est})$ in said predetermined wavelength range of the metallurgical product (2);
  v. comparing (E5) said estimated spectral emissivity $\varepsilon_{est}(\lambda, T_{est})$ and temperature $T_{est}$ with the reference spectral emissivity $\varepsilon_{ref,i}(\lambda, T_{ref})$ and the reference $T_{ref}$ temperature of each reference radiance $L_{ref,i}(\lambda, T_{ref})$ from the database;
  vi. determining the best fitting reference radiance $L_{bf}(\lambda, T_{ref})$ (E6) with the observed radiance $L_{obs}(\lambda, T_{est})$, and
  vii. determining the chemical composition (E7) of the emitting metallurgical product (2).

The method may also comprise the following optional characteristics considered individually or according to all possible combination of techniques:
  an attenuation coefficient of the atmosphere is also estimated from the observed radiance in step iv, said observed radiance being correlated with said attenuation coefficient,
  Step iii is implemented following the following sub-steps:
    converting the spectral signal into an ideal black body radiance $L_{BB}(\lambda, T)$;
    correcting this ideal radiance $L_{BB}(\lambda, T)$ with at least a calibration constant calculated by the processing means and associated with the spectroscopic means, said calibration constant being calculated using a calibration lamp of known emitting temperature and known emissivity in the wavelength range.

Step iv is implemented following the following sub-steps:
  determining a vector which coordinates are randomly chosen variables representing at least the emitting temperature and the emissivity in the wavelength range;
  calculating an expected radiance $L_{exp}(\lambda, T)$ based on the chosen variables;
  fitting an inference probabilistic model by comparing observed radiance and expected radiance, to randomly modify expected variance by randomly modifying the chosen variables, until convergence of the expected radiance $L_{exp}(\lambda, T)$ towards the observed radiance $L_{obs}(\lambda, T_{est})$;
  estimating the emitting temperature $T_{est}$ and the emissivity $\varepsilon_{est}(\lambda, T_{est})$ in the wavelength range of the liquid metallurgical product by using such fitted inference probabilistic model.

One of the coordinates of the vector comprises the attenuation coefficient of the atmosphere, and wherein said attenuation coefficient is also estimated by using such fitted inference probabilistic model.

Step iv is implemented using a reduced set of wavelengths which are determined from the wavelength range using a triangular transfer function.

Steps v to vii are carried out by a multilayer perceptron implemented by the processing means.

BRIEF DESCRIPTION OF THE DRAWINGS

Other characteristics and advantages of the invention will be apparent in the below descriptions, by way of indication and in no way limiting, and referring to the annexed figures among which.

DETAILED DESCRIPTION

First, it is noted that on the figures, the same references designate the same elements regardless of the figure on which they feature and regardless of the form of these elements. Similarly, should elements not be specifically referenced on one of the figures, their references may be easily found by referring oneself to another figure.

It is also noted that the figures represent mainly one embodiment of the object of the invention but other embodiments which correspond to the definition of the invention may exist.

Figure 1:
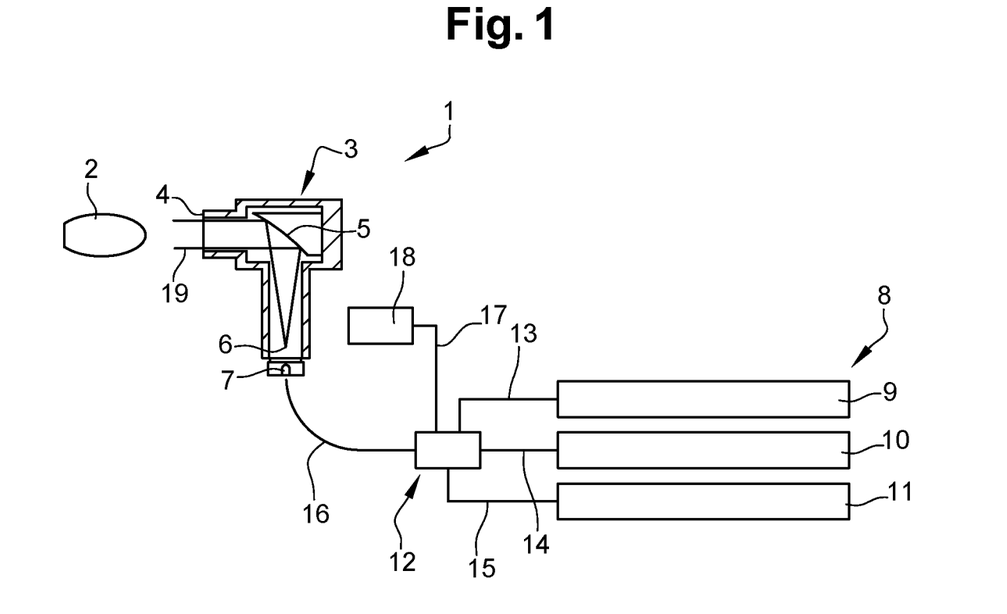
FIG. 1 represents a schematic view of the system of the invention.

The spectral system 1 and the method of the invention find application in the estimation of the chemical composition of a liquid metallurgical product 2, for example slags or liquid steel.

Hot elements, such as liquid metal like liquid steel, emit electromagnetic radiations correlated with their respective emitting temperature and chemical composition. These radiations are emitted in a large emission spectrum, typically from ultraviolet wavelengths to far-infrared wavelengths, including infrared and visible wavelengths directly related to the emitting temperature inducing the red to white aspect of liquid metallurgical products.

Physical parameters can be extracted from measurable characteristics of said electromagnetic radiations. Those physical parameters include:
  T, named temperature which is the temperature of the liquid metallurgical product 2 emitting electromagnetic radiations;
  $\varepsilon(\lambda, T)$, named spectral emissivity or simply emissivity which is the radiant flux of electromagnetic radiations emitted by a surface element at a given temperature T and at a given wavelength $\lambda$ compared to that of a perfect black body. The value of emissivity is thus comprised between 0 and 1.
  $L(\lambda, T)$, named spectral radiance which is the radiant flux emitted by a given surface, per unit solid angle per unit projected area and per unit wavelength. The term "radiance" will be used in the following.

While acquiring the electromagnetic radiations emitted by a liquid metallurgical product 2, the spectral system 1 of the invention that will now be described is provided to estimate at least the physical parameters mentioned above and then to determine the chemical composition of the considered liquid metallurgical product 2 using these estimated physical parameters.

As depicted in FIG. 1, the spectral system 1 of the invention comprises at least one collection probe 3 in wide spectral range, meaning the collection probe is fully operational at least for wavelengths from 0.1 micrometres to 15000 micrometres. This collection probe 3 comprises a collection head 4 provided to collect the radiations emitted by the hot metallurgical product 2, a collimator (not depicted) to generate parallel rays 19, focusing means 5 arranged to emit a focused beam 6 through an output 7 of the probe 3. Said output 7 is connected to optical transmission means, for example a set of optical fibres forming a fibre bundle 12 and provided to transmit the focused beam 6 through the optical fibres 13-17 of the bundle 12.

The system 1 also comprises spectroscopic means 8 provided to separate and measure spectral components of the focused beam 6 and to generate a spectral signal of the electromagnetic radiations emitted by the metallurgical product. The accuracy of the generated spectral signal depends on the resolving power of the spectroscopic means 8. In other words, the spectroscopic means 8 separate the focused beam 6 into M components m, each component m being a parameter, for example intensity, related to a specific wavelength $\lambda_m$. The higher the resolving power is, the bigger M is. Typically, M is over 3000.

According to FIG. 1, the spectroscopic means 8 comprise three spectrometers 9, 10, 11 each configured to analyse the focused beam 6 and to generate a specific spectral signal in a determined wavelength range. Each spectrometer 9-11 is optically connected to the collection probe 3 via the fibre bundle 12.

A first spectrometer 9 of the spectroscopic means has a wavelength range from 0.2 to 1.1 µm. In other words, the first spectrometer 9 is configured to generate a spectral signal from emitted radiations in the wavelength range from 0.2 µm to 1.1 µm corresponding to ultraviolet radiations and visible radiations.

A second spectrometer 10 of the spectroscopic means has a wavelength range comprised between 0.9 and 2.6 µm. In other words, the second spectrometer 10 is configured to generate a spectral signal from emitted radiations in the wavelength range between 0.9 µm and 2.6 µm corresponding to near-infrared radiations.

A third spectrometer 11 of the spectroscopic means 8 has a wavelength range comprised between 2.5 and 12 µm. In other words, the third spectrometer 11 is configured to generate a spectral signal from emitted radiations in the wavelength range between 2.5 µm and 12 µm corresponding to mid-infrared radiations.

Advantageously, the spectral system 1 also comprises a laser apparatus 18 connected to the collection probe 3 via the fibre bundle 12. This laser apparatus 18 is typically a class-B laser emitting visible light, for example a 532 nanometres green light, and is provided for pointing the acquisition surface. This laser apparatus 18 allows to choose the acquisition site.

As described above, the collection probe 3, the three spectrometers 9-11 and the laser apparatus 18 are all connected with the fibre bundle 12 comprising four inputs respectively connected to the laser apparatus 18 and the three spectrometers 9-11, and one output connected to the collection probe 3.

More precisely, the laser apparatus 18 is connected to the probe 3 via one low hydroxyl ions silica optical fibre 17, the first spectrometer 9 is connected to the probe via another one low hydroxyl ions silica optical fibre 13, the second spectrometer 10 is connected to the probe 3 via two low hydroxyl ions silica optical fibres 14, and the third spectrometer 11 is connected to the probe 3 via two polycrystalline infrared optical fibres 15.

Of course, the seven optical fibres described above are all connected 16 to the output of the collection probe 3.

Finally, the spectral system 1 comprises processing means configured to generate an observed radiance of the metallurgical product 2 from the spectral signal. Thanks to a first algorithm, the processing means are configured to determine an expected radiance from the observed radiance using an inference probabilistic model, then to estimate temperature and emissivity of the metallurgical product 2.

In addition thanks to a second algorithm, the processing means are configured to estimate the chemical composition of the emitting metallurgical product 2 such as contents in-silicon dioxide $SiO_2$, aluminum oxide $Al_2O_3$, iron (II) oxide FeO, iron (III) oxide $Fe_2O_3$, calcium oxide CaO and magnesium oxide MgO, using a known regression algorithm, advantageously a multilayer perceptron implemented by said processing means.

As it will be described below, to implement this second algorithm, the processing means comprise a database of reference radiances $L_{ref,i}(\lambda, T_{ref,n})$, each reference radiance $L_{ref,i}(\lambda, T_{ref,n})$ being associated with a sample i of known spectral emissivity $\varepsilon_{ref,i}(\lambda, T_{ref,n})$ (further called reference emissivity) at a defined reference temperature $T_{ref,n}$ and wavelength $\lambda$. Thus, each reference emissivity value $\varepsilon_{ref,i}(\lambda, T_{ref,n})$ is related to a reference temperature value $T_{ref,n}$ and a wavelength value $\lambda$ in the database. i varies from 1 to X, X being for example equal at least to 30, the higher X being, the more different chemical compositions being included into the database. n varies from 1 to Z, Z being for example equal at least to 5.

In addition, the chemical composition of each sample i in the database is known and associated both with the considered reference emissivity $\varepsilon_{ref,i}(\lambda, T_{ref,n})$ in the wavelength range $\Delta\lambda$ and the reference temperature $T_{ref,n}$. To determine the chemical composition of the liquid metallurgical product 2, the processing means are configured:

to compare the estimated emissivity $\varepsilon_{est}(\lambda, T_{est})$ and the estimated temperature $T_{est}$ with the reference emissivity $\varepsilon_{ref,i}(\lambda, T_{ref,n})$ and the reference temperature $T_{ref,n}$ of each reference radiance $L_{ref,i}(\lambda, T_{ref,n})$ from the database, for $T_{ref,n}=T_{ref}$ to determine the best fitting reference radiance $L_{bf}(\lambda, T_{est})$ with the observed radiance $L_{obs}(\lambda, T_{est})$, and to determine chemical composition of the emitting metallurgical product 2.

Figure 3:
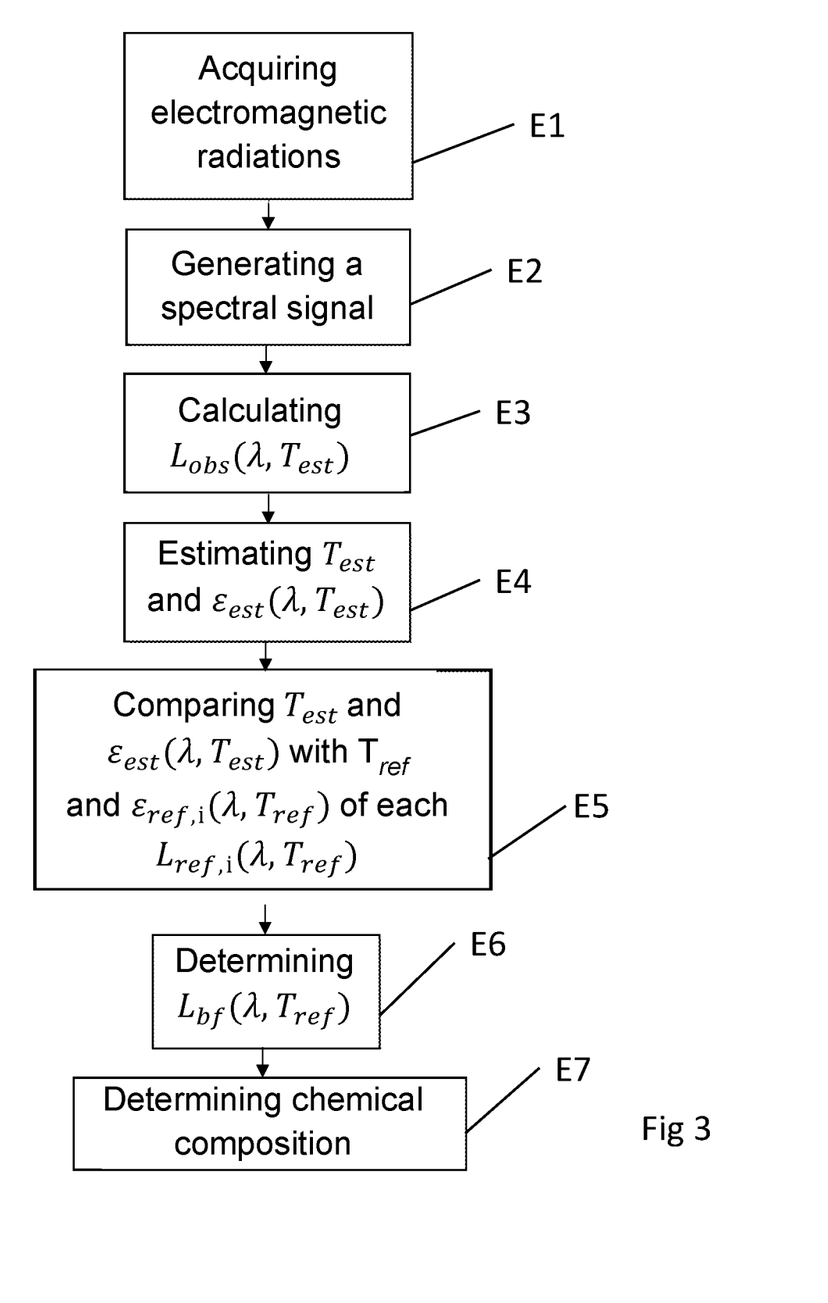
FIG. 3 represents a diagram showing the successive steps of the method of the invention.

According to the invention, a method for estimating temperature $T_{est}$ and emissivity $\varepsilon_{est}(\lambda, T_{est})$ and for determining the chemical composition of the liquid metallurgical product 2 emitting electromagnetic radiations will now be described.

In a first step, the collection probe 3 is pointed towards the acquisition site chosen by the user. To precisely choose this acquisition site, the laser 18 is powered on and the collection probe 3 is moved until the laser 18 points on the acquisition site.

In a second step E1, the collection probe 3 acquires electromagnetic radiations emitted by the liquid metallurgical product 2 at the acquisition site and concentrate this acquired radiations into a focused beam 6 which propagates from the output 7 of the probe 3 to the three spectrometers 9-11 of the spectroscopic means 8 through the fibre bundle 12. Then each spectrometer 9-11 generates a spectral signal in its specific wavelength range. The processing means of the spectral system 1 then generate E2 a combined spectral signal in the determined wavelength range from 0.2 µm to 12 µm.

In a third step E3, the processing means generate an observed radiance $L_{obs}(\lambda, T_{est})$ of the metallurgical product 2 from the combined spectral signal. This observed radiance $L_{obs}(\lambda, T_{est})$ is generated following the sub-steps described below.

In a first sub-step, the processing means convert the combined spectral signal into an ideal black body radiance $L_{BB}(\lambda, T_{est})$ through a polynomial calibration function measured by the spectral system on a black body furnace, said polynomial function following the formula:

$$L_{BB}(\lambda, T_{est}) = \frac{2hc^2}{\lambda^5} \times \frac{1}{e^{\frac{hc}{\lambda k_B T}} - 1}$$

Where h is the Planck constant, c the speed of light and $k_B$ the Boltzmann constant.

In a second sub-step, this ideal radiance $L_{BB}(\lambda, T_{est})$ is corrected with a constant K directly related to the spectroscopic means 8. Since the spectrometers 9-11 of the spectroscopic means 8 do not measure the same area, and since the instrumentation (collection probe 3, fibre bundle 12, collimator 5) of the spectroscopic means 8 induce inaccuracies in the measurements, a correction constant $K_s$ must be applied for each spectrometer S. This constant K is thus a vector which coordinates are the constants $K_1$, $K_2$ and $K_3$ of respectively the first spectrometer 9, second spectrometer 10 and third spectrometer 11.

Initial values of those constants $K_1$ to $K_3$ are determined using the spectral system 1 on a calibration lamp with known emissivity in the wavelength range and of known emitting temperature.

The ideal radiance $L_{BB}(\lambda, T_{est})$ corrected by the processing means with the calculated constant K is the observed radiance $L_{obs}(\lambda, T_{est})$.

In a fourth step E4, the processing means implement the first algorithm to estimate the temperature $T_{est}$ and the emissivity $\varepsilon_{est}(\lambda, T_{est})$ in the wavelength range of the liquid metallurgical product 2.

As depicted above, it is known that radiance is a function of several physical parameters including emissivity in the wavelength range and the emitting temperature of the metallurgical product 2. The first algorithm thus implements a radiative transfer model which purpose is to extract these unknown parameters so they can fit with the observed radiance $L_{obs}(\lambda, T_{est})$.

The processing means are then calculating an expected radiance $L_{est}(\lambda, T_{est})$ following a Markov Chain MonteCarlo approach or MCMC approach, using for example a Metropolis-Hasting algorithm also named Metropolis-Hasting random walk. The expected radiance can be described following the formula:

$$L_{exp}(\lambda, T_{est}) = f\left[K \cdot \varepsilon_{est}(\lambda, T_{est}) \cdot L_{BB}(\lambda, T_{est}) \cdot e^{d(x_{CO_2} \cdot \gamma_{CO_2} + x_{H_2O} \cdot \gamma_{H_2O})}\right]$$

Where $d(x_{CO_2}\gamma_{CO_2}+x_{H_2O}\gamma_{H_2O})$ is an attenuation coefficient of the atmosphere due to water vapor and carbon dioxide. x is related to concentration of the considered gas, $\gamma$ is related to the known attenuation coefficient of the considered gas, and d is the distance between the radiating element and the spectrometers 9-11. In addition, f is a transfer function modeling the reflectivity attenuation, optical fibres attenuation and non-linear sensitivity of the spectrometers 9-11. This transfer function f is calculated using a calibrated black body furnace with the spectral system 1.

The MCMC approach allows to estimate the unknown parameters which are the emitting temperature, the emissivity in the range of wavelengths $\lambda$, and concentration of water vapor and carbon dioxide, by implementing a Bayesian inference model and comparing the calculated expected radiance with the observed radiance. In addition, the calibrated correction coefficients $K_1$ to $K_3$ are finely tuned thanks to the Metropolis-Hasting algorithm.

A Bayesian inference model constructs a probability distribution over the values of the seek unknown parameters, using the following formula:

$$P(\theta|x) = \frac{P(x|\theta) \cdot P(\theta)}{P(x)}$$

Where x represents the observed radiance $L_{obs}(\lambda, T_{est})$ while $\theta$ is a vector which coordinates are the unknown parameters: $\theta = \{T_{est}, x_{CO_2}, x_{H_2O}, K_1, K_2, K_3, \varepsilon_1, \varepsilon_2 \ldots \varepsilon_M\}$.

$P(\theta|x)$, known as the posterior probability distribution, is the probability of each seek unknown parameter value given $L_{obs}(\lambda, T_{est})$. This is the probability that processing means need to compute in order to estimate the unknown parameters.

$P(x|\theta)$, known as the likelihood, is the way the observed radiance $L_{obs}(\lambda, T_{est})$ is distributed given a parameter set. The calculation of this probability will be explained later.

$P(\theta)$, known as the prior distribution, is the prior knowledge used to let the processing means compute the Metropolis-Hasting algorithm. In other words, as it will be explained later, a set of parameters $\theta_0$ is randomly chosen in the beginning of the computation.

$P(x)$ is the evidence that the parameters are generated by the radiative transfer model. This quantity cannot be calculated in many cases. However, $P(\theta|x)$ can be estimated using MCMC approach, especially the Metropolis-Hasting algorithm, only by defining the likelihood $P(x|\theta)$ and the prior $P(\theta)$.

The detailed implementation of fourth step E4 of the method of the invention will now be described.

As specified above, the emissivity depends on wavelength, meaning that each wavelength is associated with an emissivity. Since the spectroscopic means 8 resolving power allows generating M discretized spectral values, each related to a unique wavelength $\lambda_m$, M emissivity values could be determined by the processing means implementing the method of the invention.

However, since M is over 3000, the processing means cannot estimate M emissivity values based on M wavelengths, because of calculation power limits. To solve this problem, a selection of N reduced sets of wavelengths must be first accomplished by the processing means, using for example a membership triangular function following the formula:

$$\text{For } m = 1 \text{ to } N, Mf_m(\lambda) = \begin{cases} 1 - \left|\frac{\lambda - \lambda_{Cm}}{D}\right| & \text{if } \lambda_{Cm} - D < \lambda < \lambda_{Cm} + D \\ 0 & \text{otherwise} \end{cases}$$

Where $\lambda_{Cm}$ is the central wavelength and D the distance between two consecutive wavelengths.

The processing means associate the M wavelengths with the triangular function to calculate N sets of wavelengths. N is much smaller than M, the value of N being typically around 4 to 10. Since the N sets are calculated using fuzzy logic, said sets are usually named fuzzy sets.

Furthermore, a specific emissivity $\varepsilon_m$ at a wavelength $\lambda_m$ is calculated by the processing means as a weighted value of fuzzy emissivity values $\varepsilon_m$ each defined at the center of the considered fuzzy set of wavelengths, following the formula:

$$\text{For } m=1 \text{ to } N, \varepsilon_m = \int_{m=1}^{N} Mf_m(\lambda_m) \cdot \varepsilon(\lambda_m) d\lambda_m$$

Figure 2:
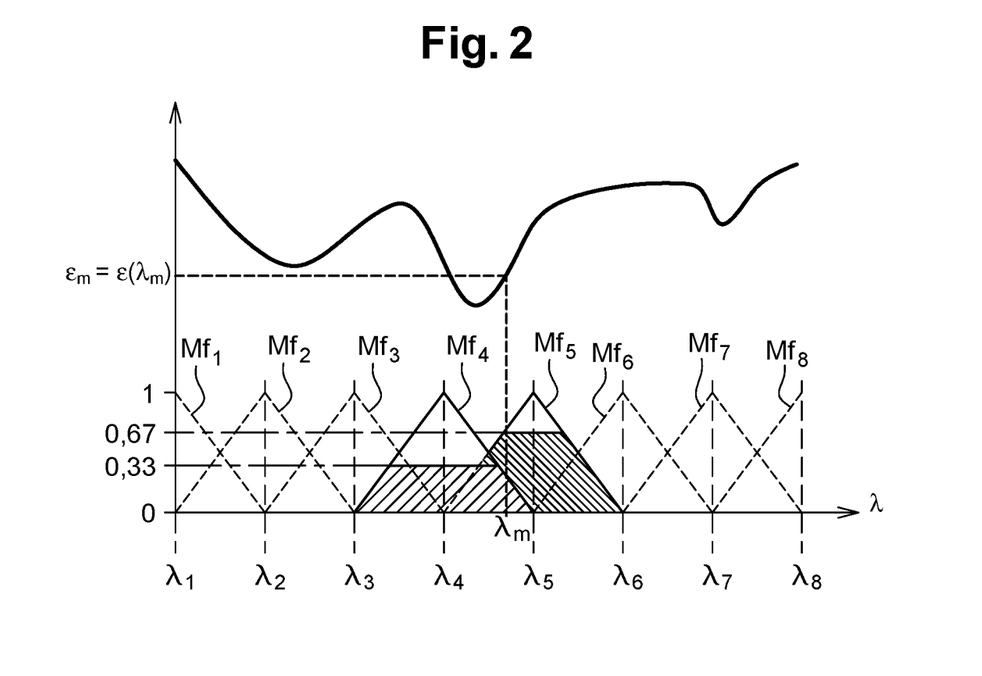
FIG. 2 represents a graph of the application of a triangular function for determining a set of pondered wavelengths from a determined wavelength range.

For example, and as depicted in FIG. 2 where N=8, the emissivity $\varepsilon_m = \varepsilon(\lambda_m)$ is a combination of 33% of the fuzzy emissivity $\varepsilon_4 = \varepsilon(\lambda_4)$ and of 67% of the fuzzy emissivity $\varepsilon_5 = \varepsilon(\lambda_5)$. As a result, only N values of emissivity are directly calculated by the processing means, meaning each emissivity $\varepsilon_m$ for m=1 to N. Other emissivity values in the wavelength range are calculated from one or several fuzzy emissivity. $\lambda$ may thus represent indifferently a wavelength or a wavelength range when using such triangular function or any other similar function allowing to reduce the sets of wavelengths.

Once the reduced set of wavelengths is selected, the processing means using the Metropolis-Hasting algorithm randomly generate a vector $\theta_0$ which coordinates are the unknown parameters randomly chosen by the processing means. Then the processing means calculate the prior distribution $P(\theta_0)$ from the randomly chosen parameters using uniform distribution functions and normal distribution functions.

A uniform distribution function is applied to emitting temperature T following the formula $$U(T_{min}, T_{max}) = \begin{cases} 0 & \text{if } T < T_{min} \\ \frac{T - T_{min}}{T_{max} - T_{min}} & \text{if } T_{min} < T < T_{max}, \\ 1 & \text{if } T > T_{max} \end{cases}$$

where $T_{min} = 400°$ C. and $T_{max} = 1500°$ C.

A uniform distribution function is applied to spectral emissivity $\varepsilon(\lambda)$ following the formula $$U(\varepsilon_{min}, \varepsilon_{max}) = \begin{cases} 0 & \text{if } \varepsilon < \varepsilon_{min} \\ \dfrac{\varepsilon - \varepsilon_{min}}{\varepsilon_{max} - \varepsilon_{min}} & \text{if } \varepsilon_{min} < \varepsilon < \varepsilon_{max} \\ 1 & \text{if } \varepsilon > \varepsilon_{max} \end{cases}$$

where $\varepsilon_{min}=0$ and $\varepsilon_{max}=1$.

A normal distribution function centered on $K_s^0$ is applied to each correction coefficient $K_s$ following the formula $$\aleph(K_s^0, \sigma^2) = \frac{1}{\sigma\sqrt{2\pi}} \int_{-\infty}^{K_s} e^{\frac{1}{2} \times \frac{(t-K_s^0)^2}{\sigma^2}} dt$$

where $K_s^0$ is the initial calibration constant of the $s^{th}$ spectrometer 9-11 calculated with the calibration lamp, and $\sigma^2 = 0.001^2$, $\sigma^2$ being the variance of the distribution.

Normal distribution functions respectively centered on $x_{CO_2}^0$ and $x_{H_2O}^0$ are also applied to $x_{CO_2}$ and $x_{H_2O}$:

$$\aleph(x_{CO_2}^0, \sigma^2) = \frac{1}{\sigma\sqrt{2\pi}} \int_{-\infty}^{x_{CO_2}} e^{\frac{1}{2} \times \frac{(t-x_{CO_2}^0)^2}{\sigma^2}} dt$$

where $x_{CO_2}^0 = 450$ ppm and $\sigma^2 50^2$, and $$\aleph(x_{H_2O}^0, \sigma^2) = \frac{1}{\sigma\sqrt{2\pi}} \int_{-\infty}^{x_{H_2O}} e^{\frac{1}{2} \times \frac{(t-x_{H_2O}^0)^2}{\sigma^2}} dt$$

where $x_{H_2O}^0 = 36000$ ppm and $\sigma^2 = 500^2$.

With the results of calculation of each distribution described above, the processing means determines the prior distribution $P(\theta_0)$.

In addition, once the coordinates of vector $\theta_0$ are randomly determined, the processing means calculate a first value of expected variance $L_{exp}(\theta_0)$ with the formula described above, using the unknown parameter values of $\theta_0$.

The processing means thus calculate the likelihood $P(L_{obs}|\theta_0)$ using a normal distribution function $\aleph(L_{exp}(\theta_0), \sigma^2)$ centered on $L_{exp}(\theta_0)$, $\sigma^2$ being a Half-Cauchy distribution $\sigma \sim \text{Half Cauchy}(\beta)$ which formula is:

$$\sigma(t) \sim \frac{2}{\pi} \arctan\left(\frac{t}{\beta}\right).\beta$$

is a fix parameter which value is chosen at 10.

The processing means randomly generate a vector $\theta_1$ following a normal distribution $\theta_1 = \aleph(\theta_0, \sigma^2)$ centered on $\theta_0$. A new set of unknown parameters is thus randomly chosen and the processing means calculates $L_{exp}(\theta_1)$, the likelihood $P(L_{obs}|\theta_1)$ and the prior $P(\theta_1)$.

A number $r_1$ is then calculated following the formula:

$$r_1 = \frac{P(L_{obs}|\theta_1) \cdot P(\theta_1)}{P(L_{obs}|\theta_0) \cdot P(\theta_0)}$$

A random number r' is also calculated using a standard uniform distribution $$U(0, 1) = \begin{cases} 0 & \text{if } r' < 0 \\ r' & \text{if } 0 < r' < 1 \\ 1 & \text{if } r' > 1 \end{cases}$$

The value of r' is between 0 and 1.

The processing means compare $r_1$ and r' and if $r_1 > r'$, then the vector $\theta_1$ is kept and a vector $\theta_2$ is calculated following the normal distribution $\theta_2 = \aleph(\theta_1, \sigma^2)$ centered on $\theta_1$. If $r_1 < r'$, the vector $\theta_1$ is rejected and a new vector $\theta_1'$ is randomly calculated following the normal distribution $\theta_1' = \aleph(\theta_0, \sigma^2)$ as long as $r_1 < r'$.

The vectors $\theta_y$ are calculated step by step following this approach with $\theta_y = \aleph(\theta_{y-1}, \sigma^2)$, until $y = y_{max}$. For example, $y_{max} = 2000$. The bigger $y_{max}$ is, the more accurate the estimation is but the longer the calculation is.

The Metropolis-Hasting random walk implemented by the processing means make the expected variance $L_{exp}(\lambda, T)$ converge towards the observed radiance $L_{obs}(\lambda, T_{est})$ with an estimated set of parameters which are the coordinates of the final vector $\theta_{i_{max}}$.

Given an observed radiance $L_{obs}(\lambda, T_{est})$, the MCMC approach estimates the values of the emitting temperature $T_{est}$ and of the spectral emissivity $\varepsilon_{est}(\lambda, T_{est})$ of the liquid metallurgical product 2. In addition, the internal correction parameters $K_1$ to $K_3$ of the spectrometers 9, 10, 11 and the concentration of both water vapor $x_{H_2O}$ and carbon dioxide $x_{CO_2}$ in the atmosphere are also estimated.

The processing means execute the second algorithm to implement a fifth step E5, a sixth step E6 and a seventh step E7 of the method of the invention. In the fifth step E5, the processing means compare the emissivity $\varepsilon_{est}(\lambda, T_{est})$ and temperature $T_{est}$ estimated from the observed radiance $L_{obs}(\lambda, T_{est})$ with the reference emissivity $\varepsilon_{ref,i}(\lambda, T_{ref,n})$ and the reference emitting temperature $T_{ref}$ of each reference radiance $L_{ref,i}(\lambda_k, T_{ref,n})$ from the database for $T_{ref,n} = T_{ref}$. Using the comparison results obtained in fifth step E5, the processing means determine in the sixth step E6 the best fitting reference radiance $L_{bf}(\lambda, T_{ref})$ with the observed radiance $L_{obs}(\lambda, T_{est})$. Finally the processing means attributes the chemical composition related to the best fitting reference radiance $L_{bf}(\lambda, T_{ref})$ to the emitting metallurgical product 2. Thus the processing means have determined the chemical composition of the emitting metallurgical product 2.

Advantageously, this second algorithm is a known regression algorithm, preferentially a multilayer perceptron which is an artificial neural network comprising a number J of interconnected neural layers, said artificial neural network being implemented by the processing means.

Each digital neuron of a layer of the neural network comprises a plurality of inputs provided to receive data from the outputs of the neurons of the preceding layer, and an output provided to send an output data to the neurons of the next layer. More precisely, the input data are processed by the digital neuron using an operator, typically a combination function summing all input data each weighted with a synaptic weight to generate the output data. In addition, each neuron may comprise a nonlinear transfer function which is a threshold function provided to generate an output data if the weighted summing of the input data is over the threshold defined by the threshold function. Typically, said threshold function is a sigmoid function which formula is $$f(x) = \frac{1}{1 + e^{-x}}.$$

Each input of a neuron j of a neural layer is affected with a specific synaptic weight. The synaptic weights of the inputs are first randomly chosen when the multilayer perceptron is programmed. As it will be discussed later, those synaptic weights are adjusted during a training phase of the neural network.

Artificial neural networks are provided to predict and classify data carrying out regression analysis of injected data through the input of the neural network, meaning through the inputs of the neurons of the first layer. Injected data are a vector $X^0$ of j coordinates and are successively processed by the first neural layer and all intermediate neural layers.

Output data, meaning data obtained at the output of the neural network, is a vector $Y^J$ of j coordinates related to the vector $X^0$ representing the injected data.

The vector $X^0$ comprising j coordinates, the first layer and all intermediate neural layers of the neural network also comprises j neurons each having j inputs, each input being affected with a specific synaptic weight. The last layer comprises j neurons since the output vector $Y^J$ comprises j coordinates.

To sum up data regression implemented by the neural network, the input data received by each neuron of a layer j are the output data generated by the outputs of all neurons of layer j−1. In other words, each layer j of the neural network generates an output vector $Y^j$ from an input vector $X^j$ which has been processed with the transfer functions of the neurons of layer j. The coordinates of $X^j$ are the same coordinates than the output vector $Y^{j-1}$ of layer j−1, while the coordinates of the input vector $X^{j+1}$ of layer j+1 are the same coordinates than the output vector $Y^j$ of layer j.

At the output of the neural network, the output vector $Y^J$ results from the processing of input vector $X^J=Y^{J-1}$ by the output layer of the neural network. Data regression is thus implemented via data propagation in the successive layers of the neural network.

Regarding fifth E5 to seventh E7 steps of the method of the invention, the coordinates of the input vector $X^0$ are the estimated emitting temperature $T_{est}$ and the different values of estimated emissivity $\varepsilon_{est,m}(\lambda_m, T_{est})$ for each centered wavelength $\lambda_m$ of the N fuzzy sets. This input vector $X^0$ is successively process by the layers of the neural network to generate an output vector $Y^M$ which coordinates are the proportions of different chemical compounds of the metallurgical product 2. In other words, the processing means in the fifth to seventh steps determine the chemical composition of the metallurgical product 2 from its estimated spectral emissivity $\varepsilon_{est}(\lambda, T_{est})$ and its estimated temperature $T_{est}$. However, such a processing is made possible only if the weights are correctly adjusted.

A crucial issue of the method is to finely adjust said synaptic weights to obtain good data classification and/or prediction.

The database of reference radiances $L_{ref,i}(\lambda, T_{ref,n})$ is prior constructed by measuring a collection of samples i with known chemical composition at different emitting temperatures $T_{ref,n}$. For each sample, an observed radiance is measured, and the first algorithm described above is applied on this observed radiance to obtain several reference emissivity values $\varepsilon_{ref,i,k}(\lambda_k, T_{ref})$ depending on wavelength $\lambda_k$.

The processing means thus construct a database of samples, each sample comprising an input vector $X^{i0}$ related to reference emissivity values at different reference emitting temperatures, and an output vector $Y^{iJ}$ correlated with $X^{i0}$ and related to a known chemical composition. In other words, emissivity values at a specific emitting temperature are directly related to a chemical composition of a metallurgical product 2.

To train the neural network, backpropagation functions are implemented. An input vector $X^{i0}$ correlated with a known output vector $Y^{iJ}$ is inputted in the neural network. $X^{i0}$ is processed by the neural network and a calculated output vector $Y^J$ is obtained. Then, $Y^J$ is compared to $Y^{iJ}$ with a known loss function to determine an error value. The processing means then compare this error value with a predetermined threshold.

If the error value is bigger than the threshold, this error value or preferentially the error gradient is backpropagated in the neural network to slightly adapt the weight of each neuron input. Then a new output vector $Y^J$ is calculated from $X^{i0}$ and again compared to Y'J with the loss function and a new error value is calculated. As long as the error value or its gradient is bigger than the threshold, the backpropagation step is iterated. The neural network is trained once the error value is smaller than the threshold.

The spectral system 1 and the method of the invention allows:
  acquiring electromagnetic radiations directly emitted by a liquid metallurgical product 2;
  estimating spectral emissivity $\varepsilon_{est}(\lambda, T_{est})$ in the predetermined wavelength range $\lambda$ of the system 1 and the temperature $T_{est}$ of the metallurgical product 2 from the emitted radiations, thanks to the radiative transfer model implemented by the processing means of the spectral system 1, and
  estimating chemical composition of the metallurgical product 2, thanks to the regression model implemented by the processing means.

What is claimed is:

1. A device for determining the chemical composition of a liquid metallurgical product emitting electromagnetic radiation, the device comprising:
  a collection probe configured to acquire the electromagnetic radiation emitted by the metallurgical product in a predetermined wavelength range 4;
  a spectroscopic device connected to the collection probe and configured to generate a spectral signal of the acquired electromagnetic radiation; and
  a processor configured to calculate an observed radiance $L_{obs}(\lambda, T_{est})$ from the generated spectral signal, and to estimate, from the calculated observed radiance $L_{obs}(\lambda, T_{est})$, the temperature $T_{est}$ and the spectral emissivity $\varepsilon_{est}(\lambda, T_{est})$ of the metallurgical product in the predetermined wavelength range $\Delta$,
  wherein the processor includes a database of reference radiances $L_{ref,i}(\lambda, T_{erf,n})$ of X samples i, i varying from 1 to X, in the predetermined wavelength range $\Delta\lambda$ and Z reference temperature $T_{ref,n}$, n varying from 1 to Z, comprising for each reference radiance:
    reference spectral emissivities $\varepsilon_{ref,i}(\lambda, T_{ref,n})$, associated to reference temperatures $T_{ref,n}$ in the predetermined wavelength range $\Delta\lambda$, and
    chemical compositions of the samples i,
  the processor configured to compare estimated spectral emissivity $\varepsilon_{est}(\lambda, T_{est})$ and estimated temperature $T_{est}$ with reference temperatures $T_{ref,n}$ and reference spectral emissivities $\varepsilon_{ref,i}(\lambda, T_{ref,n})$ in the predetermined wavelength range $\Delta\lambda$ and at estimated temperature $T_{est}$ included in said database, to determine a best fitting reference radiance $L_{bf}(\lambda, T_{ref})$ with the observed radiance $L_{obs}(\lambda, T_{est})$, and to determine the chemical composition of the liquid metallurgical product from the determined best fitting reference radiance $L_{bf}(\lambda, T_{ref})$.

2. The device as recited in claim 1 wherein the spectroscopic device includes a plurality of spectrometers, each spectrometer being connected to the collection probe and configured to generate a part of the spectral signal in a determined fraction of the predetermined wavelength range $\Delta\lambda$.

3. The device as recited in claim 1 wherein the spectroscopic device configured to generate the spectral signal in a spectral range between 200 and 12000 nanometres corresponding to the predetermined wavelength range $\Delta\lambda$.

4. The device as recited in claim 1 wherein the processor is also configured to correct each part of the spectral signal with at least a calibration constant calculated by said processor and associated with the considered spectrometer.

5. A method for determining a chemical composition of a liquid metallurgical product emitting electromagnetic radiation with the device as recited in claim 1, the method comprising the following steps:
  i. acquiring the electromagnetic radiations emitted by the metallurgical product in the predetermined wavelength range $\Delta\lambda$;
  ii. generating a spectral signal by separating and measuring spectral components of said electromagnetic radiation emitted by the metallurgical product;
  iii. generating an observed radiance $L_{obs}(\lambda, T_{est})$ of the metallurgical product from the spectral signal;
  iv. estimating from said observed radiance $L_{obs}(\lambda, T_{est})$ the temperature $T_{est}$ and the spectral emissivity $\varepsilon_{est}(\lambda, T_{est})$ in the predetermined wavelength range of the metallurgical product;
  v. comparing the estimated spectral emissivity $\varepsilon_{est}(\lambda, T_{est})$ and temperature $T_{est}$ with the reference spectral emissivity $\varepsilon_{ref,i}(\lambda, T_{ref})$ and the reference $T_{ref}$ temperature of each reference radiance $L_{ref,i}(\lambda, T_{ref})$ from the database;
  vi. determining the best fitting reference radiance $L_{bf}(\lambda, T_{ref})$ (E6) with the observed radiance $L_{obs}(\lambda, T_{est})$, and
  vii. determining the chemical composition (E7) of the emitting metallurgical product.

6. The method as recited in claim 5 wherein an attenuation coefficient of the atmosphere is also estimated from the observed radiance in step iv, the observed radiance being correlated with the attenuation coefficient.

7. The method as recited in claim 5 wherein step iii is implemented following the following sub-steps:
  converting the spectral signal into an ideal black body radiance $L_{BB}(\lambda, T)$;
  correcting the ideal black body radiance $L_{BB}(\lambda, T)$ with at least a calibration constant calculated by the processor and associated with the spectroscopic device, the calibration constant being calculated using a calibration lamp of known emitting temperature and known emissivity in the wavelength range.

8. The method as recited in claim 5 wherein step iv is implemented following the following sub-steps:
  determining a vector which coordinates are randomly chosen variables representing at least the emitting temperature and the emissivity in the wavelength range;
  calculating an expected radiance $L_{exp}(\lambda, T)$ based on the chosen variables;
  fitting an inference probabilistic model by comparing observed radiance and expected radiance, to randomly modify expected variance by randomly modifying the chosen variables, until convergence of the expected radiance $L_{exp}(\lambda, T)$ towards the observed radiance $L_{obs}(\lambda, T_{est})$;
  estimating the emitting temperature $T_{est}$ and the spectral emissivity $\varepsilon_{est}(\lambda, T_{est})$ in the wavelength range $\Delta\lambda$ of the liquid metallurgical product (2) by using such fitted inference probabilistic model.

9. The method as recited in claim 8 wherein one of the coordinates of the vector comprises the attenuation coefficient of the atmosphere, and wherein said attenuation coefficient is also estimated by using such fitted inference probabilistic model.

10. The method as recited in claim 8 wherein step iv is implemented using a reduced set of wavelengths which are determined from the wavelength range using a triangular transfer function.

11. The method as recited in claim 5 wherein steps v to vii are carried out by a multilayer perceptron implemented by the processor.

* * * * *